(12) United States Patent
Schleppenbach et al.

(10) Patent No.: US 8,726,145 B2
(45) Date of Patent: May 13, 2014

(54) CONTENT COMMUNICATION SYSTEM AND METHODS

(75) Inventors: David A. Schleppenbach, Lafayette, IN (US); Joe P. Said, West Lafayette, IN (US)

(73) Assignee: gh LLC, Lafayette, IN (US)

(*) Notice: Subject to any disclaimer, the term of this patent is extended or adjusted under 35 U.S.C. 154(b) by 2299 days.

(21) Appl. No.: 10/579,644

(22) PCT Filed: Nov. 18, 2004

(86) PCT No.: PCT/US2004/038518
§ 371 (c)(1),
(2), (4) Date: May 18, 2006

(87) PCT Pub. No.: WO2005/050395
PCT Pub. Date: Jun. 2, 2005

(65) Prior Publication Data
US 2007/0174765 A1    Jul. 26, 2007

Related U.S. Application Data

(60) Provisional application No. 60/520,847, filed on Nov. 18, 2003.

(51) Int. Cl.
*G06F 17/00* (2006.01)

(52) U.S. Cl.
USPC ............................ 715/234; 715/239; 715/779

(58) Field of Classification Search
USPC ................... 715/249, 234, 200, 729; 328/114
See application file for complete search history.

(56) References Cited

U.S. PATENT DOCUMENTS

| | | | |
|---|---|---|---|
| 5,850,629 A * | 12/1998 | Holm et al. | 704/260 |
| 6,725,424 B1 * | 4/2004 | Schwerdtfeger et al. | 715/239 |
| 6,912,529 B1 * | 6/2005 | Kolfman | 707/10 |
| 6,925,595 B1 * | 8/2005 | Whitledge et al. | 715/234 |
| 6,961,895 B1 * | 11/2005 | Beran et al. | 715/203 |
| 7,065,483 B2 * | 6/2006 | Decary et al. | 704/7 |
| 7,333,507 B2 * | 2/2008 | Bravin et al. | 370/466 |
| 2002/0178007 A1 * | 11/2002 | Slotznick et al. | 704/270.1 |
| 2003/0152904 A1 * | 8/2003 | Doty, Jr. | 434/350 |
| 2004/0218451 A1 * | 11/2004 | Said et al. | 365/222 |
| 2005/0021859 A1 * | 1/2005 | Willian et al. | 709/246 |

* cited by examiner

*Primary Examiner* — Laurie Ries
*Assistant Examiner* — Benjamin Smith
(74) *Attorney, Agent, or Firm* — Keith Swedo; Taft Stettinius & Hollister LLP

(57) ABSTRACT

A system and methods are disclosed to facilitate communication to, with, and for persons with special needs. The system can provide assistance with reading, test-taking, language development, or other forms of communication. The system is compatible with a variety of types of input (173), and provides a variety of options for output (174). In one embodiment, the system is portable, and can be connected to a number of different devices having varying purposes. In another embodiment, the system is software designed to be utilized as a stand-alone software application, or in conjunction with an existing or third-party application.

15 Claims, 8 Drawing Sheets

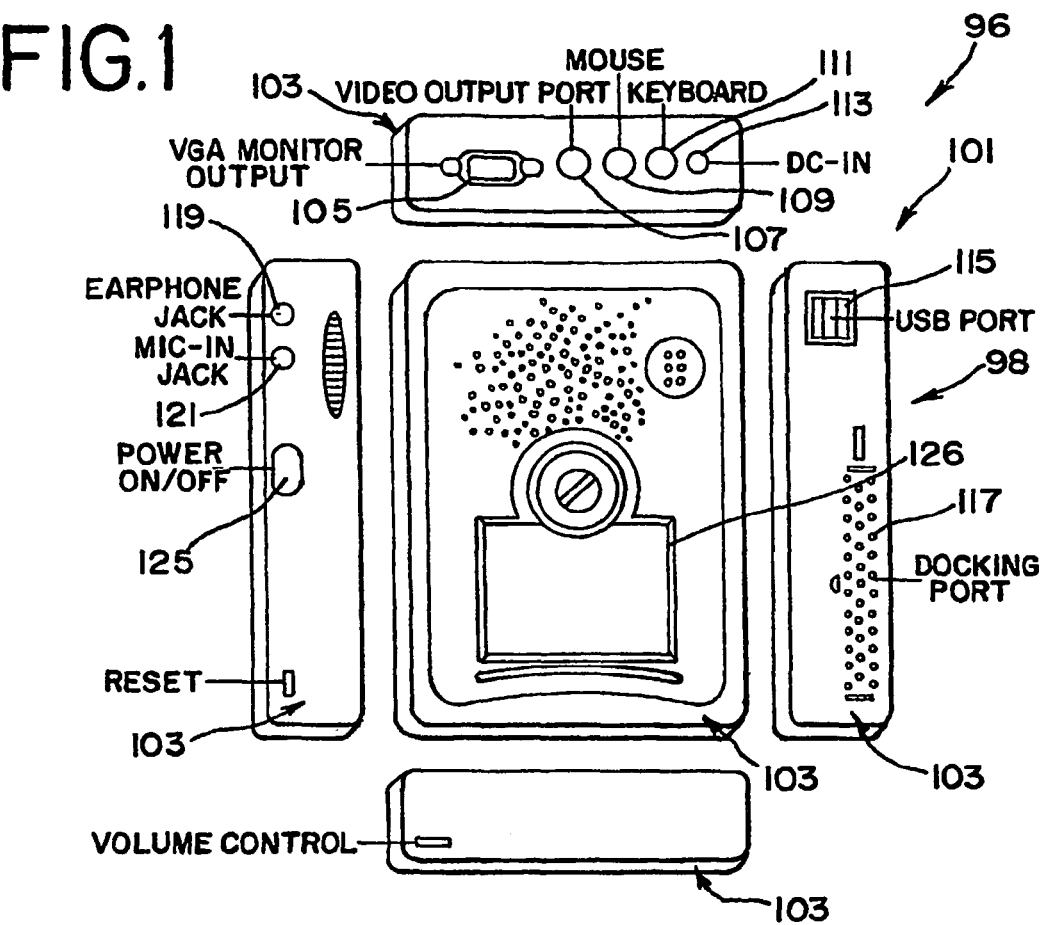
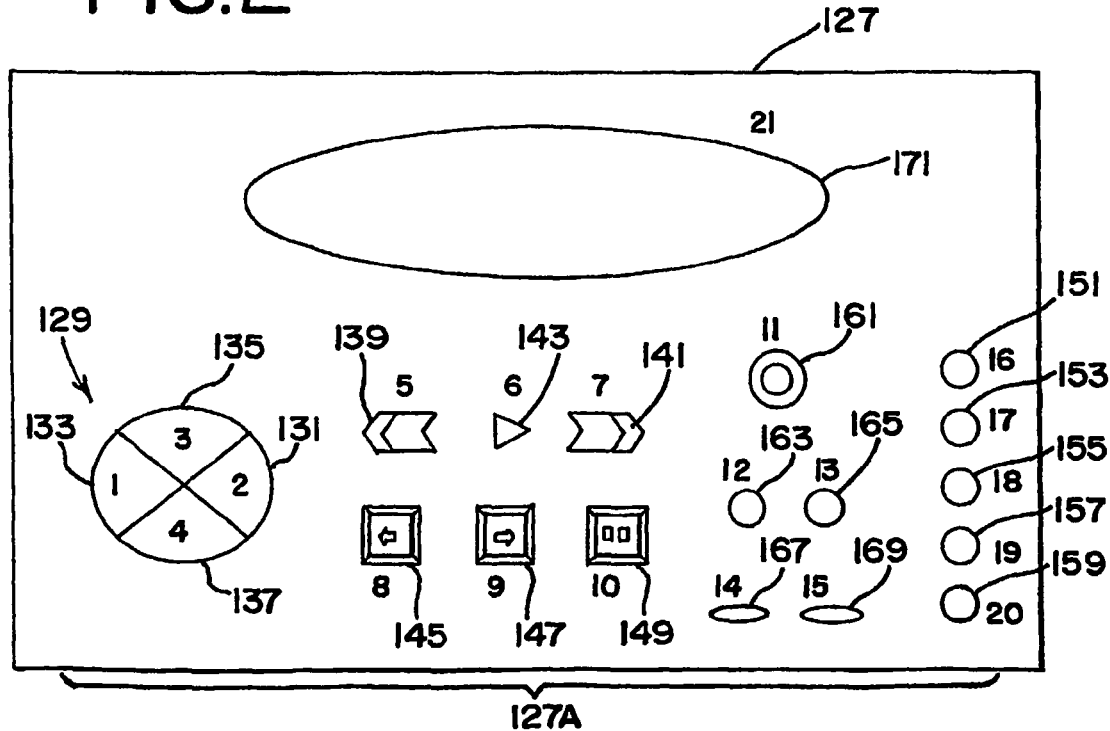

| Toolbar | Zoom 100% | Contrast | Highlighting | Speech | ◁ Previous | ▽ Disable Highlight Button | △ Next |

| OTHER TAXES | 57 SOCIAL SECURITY AND MEDICARE TAX ON TIP INCOME, ATTACH FORM 4137.... | 57 | | | |
|---|---|---|---|---|---|
| | 58 TAX ON QUALIFIED PLANS, INCLUDING IRAs, AND OTHER TAX FAVORED ACCOUNTS, ATTACH FORM 5329 IF REQ. | 58 | | | |
| | 59 ADVANCE EARNED INCOME CREDIT PAYMENTS FROM FORM(S) W-2 | 59 | | | |
| | 60 HOUSEHOLD EMPLOYMENT TAXES. ATTACH SCHEDULE H | 60 | | | |
| | 61 ADD LINES 55 THROUGH 60. THIS IS YOUR TOTAL TAX | 61 ▷ | | | |
| PAYMENTS | 62 FEDERAL INCOME TAX WITHHELD FROM FORMS W-2 AND 1099 | 62 | | | |
| | 63 2002 ESTIMATED TAX PAYMENTS AND AMOUNT APPLIED FROM 2001 RETURN. | 63 | | | |
| IF YOU HAVE A QUALIFYING CHILD ATTACH SCHEDULE EIC. | 64 EARNED INCOME CREDIT (EIC) | 64 | | | |
| | 65 EXCESS SOCIAL SECURITY AND TIER 1 RRTA TAX WITHHELD (SEE PAGE 56) | 65 | | | |
| | 66 ADDITIONAL CHILD TAX CREDIT. ATTACH FORM 8812 | 66 | | | |
| | 67 AMOUNT PAID WITH REQUEST FOR EXTENSION TO FILE (SEE PAGE 56) | 67 | | | |

FIG. 10

PAGE NAVIGATION ◁ ◁ ▷ ▷ | SEARCH ___ | ▷ GOTO ___ ▽

BUILDING THE RAILROAD

LEARNING FROM DIAGRAMS

1 WORKERS WERE LOWERED IN BASKETS DOWN THE SIDES

2 WORKERS USED SIMPLE TOOLS SUCH AS PICKAXES AND

3 SHEDS WERE BUILT OVER THE TRACKS TO KEEP SNOW

BESIDES LAYING TRACKS, WHAT OTHER KINDS OF JOBS DID

SECTION NAVIGATION ◁ ◁ ▷ ▷

3 STUDY LEARN (A) PERVADE : ENCOMPASS
(B) SEARCH : FIND
(C) GATHER : WIN
(D) AGREE : KEEP
(E) ACCUMULATE : RAISE

CONTENT COMMUNICATION SYSTEM AND METHODS

RELATED APPLICATIONS

This application claims the priority of U.S. Patent Application No. 60/520,847, filed on Nov. 18, 2003, incorporated herein by reference.

FIELD OF THE INVENTION

The present invention relates to a system and methods for communicating. More particularly, the present invention relates to a system including an apparatus and methods for facilitating communications to, by, and between persons and for providing media accessibility to persons.

BACKGROUND OF THE INVENTION

Many types of media content and other works exist that may not be accessible to certain persons. For purposes of this application, the terms "content", "media", and "work" are used largely interchangeably, and are used to describe that which may be inputted into the system described herein. Persons that may have difficulty in accessing a full range of content may be blind, have low vision, have learning or cognitive disabilities, mobility impairments, or may be deaf or hard of hearing. Alternatively, such persons may have little literacy in a given language, whether it is because it is a second language to them or because of other circumstances. In such a scenario, a system and methods for communicating content to such persons is needed. These persons shall be collectively termed "special needs persons" or a term similar to the same.

The desired output is dependent upon the particular need of the user. For example, a blind person may wish to be able to utilize text-to-speech ("TTS") output, customized keyboard control, an output to a Braille display, or an output to a Braille embosser. A person with low vision may wish to have a display with greater contrast, and, accordingly, may benefit from a display that incorporates a contrast control to adjust the background/foreground colors, or that incorporates screen enlargement capabilities, text highlighting, etc.

Still others may find content more easily understood if features, such as highlighting and speech generation, are included, if the rate at which speech is aurally communicated is adjustable, and if dictionary, thesaurus, or other reference works features are included. Multimodal transmission of content, as well as an ability to repeat content, could assist individuals with learning disabilities.

Still other persons could be benefited with devices that accommodate mobility impairments. Such devices may include alternative pointing devices, voice recognition capabilities, user-definable keyboards, and on-screen virtual keyboard and word prediction. These devices would ideally be incorporated with media content in order to deliver such content to mobility-impaired persons.

Deaf and hard-of-hearing persons may benefit from the transmission of media through virtual sign language via a virtual reality avatar or human concatenated video. Text captioning may also prove to be helpful either in conjunction with the virtual sign language or in the alternative.

Still other persons may benefit from a system and methods that transmit media or other works via various outputs. For example, some persons may prefer the benefits of media that is transmitted in one or more of the forms disclosed above. Others, such as those who struggle with the English language, may find that a certain method of transmitting the media is helpful in learning the language. Furthermore, features such as an incorporated dictionary and thesaurus may prove helpful.

Accordingly, a demand exists for a system and methods which accept content from a variety of sources and through a variety of system, apparatuses, and methods and can process the content to provide modified content in a variety of formats to individuals with varying disabilities. The present invention satisfies the demand. Advantageously, the present invention can be used to communicate content to persons without disabilities.

SUMMARY OF THE INVENTION

The present invention is directed to a system and methods which accept content from a variety of sources and through a variety of system, apparatuses, and methods and can process the content to provide modified content in a variety of formats to individuals with varying disabilities. Inputted content may embody any type of format, including a text file, a MICROSOFT WORD word processing software file, an ADOBE ACROBAT computer program File, an HTML document, an XML document, an xHTML document, a QUARK XPRESS computer application document, a WORDPERFECT word processing application document, an SGML document, and an ADOBE PAGEMAKER desktop publishing program document. The content can then be converted into an XML format. If data is embedded in the content that allows for the construction of a DOM tree, such is constructed. Otherwise, it can be assembled from a scan of the content. Modified or converted content can then be outputted into an output device.

The system may include a processor configured to accept content input and modify the content input. The system may include a removable input device configured to deliver the content input to the processor. A control input device can be provided for sending signals to the processor to direct operations relating to the content input. Furthermore, a handicap-accessible output device can be configured to deliver the modified content to a user.

The present system and methods can communicate through a variety of known apparatuses and systems. Accordingly, it is unnecessary to prepare or have additional software for the operation of these apparatuses and systems.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 shows one embodiment of an input/output/processing apparatus;

FIG. 2 is a simplified view of one embodiment of a control panel of an apparatus of the system;

FIG. 9 shows still another example of a software application used to view a document;

FIG. 10 shows one embodiment of an avatar and the context in which it can be used that can be provided by the software in order to communicate via sign language;

FIG. 11 shows a sample test question;

DETAILED DESCRIPTION OF EMBODIMENTS OF THE INVENTION

Figure 2A:
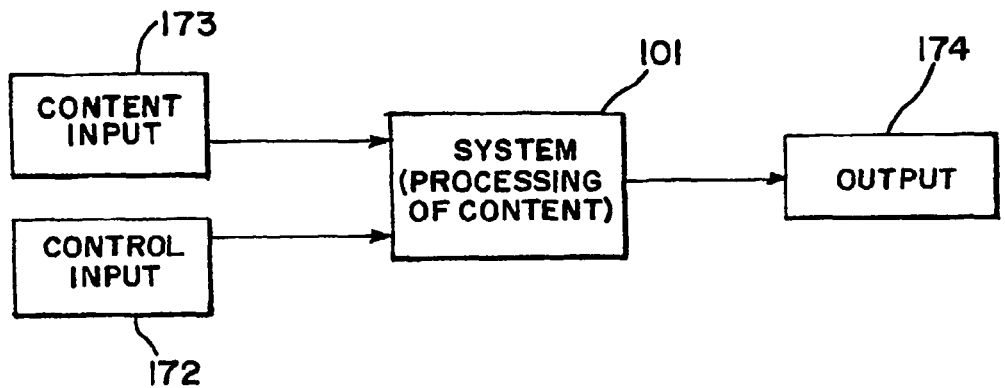
FIG. 2A is a flowchart showing how content input and control input are processed by the system to provide output.

The present invention is directed to a system 101 that facilitates communication to, with, and for special needs persons. For example, the system 101 can provide assistance to persons with special needs, those are, for example, those that require assistance with reading, test-taking, language development, or other forms of communication. The system 101 is compatible of receiving content from a variety of types of input systems and apparatus, and provides one or a variety of options by which the content of many varieties may be outputted. Systems of this type may be called "MIMO", or multi-input, multi-output. In one embodiment, system 101 is portable, and can be connected to a number of different other systems and apparatus having varying purposes.

System 101 is sufficiently robust to accept content from many different other systems, methods, and devices. The input methods and devices can be classified into two groups: control input 172 and content input 173 (shown in FIG. 2A). Control input 172 may include the buttons on the control panel 127, discussed below. Other control input 172 may include a keyboard, mouse, or microphone (not shown). Of course, the system 101 may include fewer or additional input and output ports and controls. System 101 may be configured to accept voice commands from the microphone, as well as perform voice recognition for dictation and content entry. Voice recognition software may be implemented that integrates with an on-screen virtual keyboard, and/or with word prediction capabilities. System 101 could use inputted content to generate speech for a user, allowing interactive communication with a test proctor, for example. In the case of severe mobility impairments, a user could control system 101 with a control input 172 such as head-pointer, a special user-defined keyboard, a sip-and-puff device, etc. Depending on the use and configuration of system 101, any one or all of the described control inputs 172 may be used in a particular application.

As disclosed further herein, system 101, in one embodiment, includes a processing component to which a database may be coupled. System 101 can be configured for a single specific purpose, e.g., assisting with the administration of a test to a user, or the system 101 may be configured to be multi-functional. For example, system 101 could be configured, loaded with content, and distributed by a testing company for use in the administration of a standardized test. The system 101 may then be retrieved after the administration of the test. In the alternative, system 101 may be an assistive device that the user is permitted, in addition to using, rent or own, the device being configured and/or loaded with certain content to perform one or numerous tasks for the user in one or a number of scenarios.

FIG. 1 illustrates one embodiment of a housing 103. System 101 may include a housing 103 having the various views illustrated, and may further have numerous input ports 96 and output ports 98 mounted thereto. The output ports 98 may include, for example, a monitor output 105 and a video output port 107. A display 126 may also be provided as an output on the housing 103. The input ports 96 may include, for example, a mouse input port 109, a keyboard input port 111, a DC electrical port 113, a USB port 115 capable of both input and output, a docking port 117, an earphone jack 119, and a microphone jack 121. The housing 103 may include other controls such as a volume control 123, a power button 125, and a control panel 127 (shown in FIG. 2). The control panel 127 may include various controls, described in more detail below.

As disclosed above, system 101 may accept content inputted from one or more other systems and apparatus devices, and may be configured to respond to instructions or otherwise be able to respond to such inputs in a number of ways. One embodiment of the system 101 includes a housing 103 having a control panel 127 that carries strategically placed buttons for inputting directions from a user, as can be seen in FIG. 2. The illustrated control panel 127 includes controls 127A, some of which are particularly useful in a test environment, such as the example described wherein system 101 is distributed by the test company for the administration of their test.

As seen in FIG. 2, control panel 127 includes controls 127A. The embodiment shown in FIG. 2 includes a variety of controls 127A, one of which is a rocker 129 that has various rocker portions the user can depress to provide instructions. For example, a jump to the next section of the content may be triggered by depressing first rocker portion 131, a jump to the previous section may be triggered by depressing second rocker portion 133, content in page-like format can be accessed by triggering a page up control by depressing third rocker portion 135, and page down triggered by depressing fourth rocker portion 137. The depression of forward and backward arrows 139, 141 can trigger the previous portions of content such as questions of a test, respectively. Button 143 may trigger the playback of audio; buttons 145 and 147 trigger, respectively, rewinding or fast-forwarding of the audio by a certain predetermined amount, and button 149 pauses playback.

Buttons 151, 153, 155, 157, and 159 may be illustratively designated specifically for test answer options, i.e. the depression of one of the buttons 151, 153, 155, 157, and 159 would signify that the test-taker is answering A, B, C, D, or E, respectively, to the question. Buttons 151-159 may also identify other choices of content such as channels, frequencies, or streams of content. Button 161 may toggle the self-voicing keys on and off. The depression of button 163 may open a help file, and the depression of button 165 causes the test to return to the beginning. Buttons 167 and 169 may control the reading rate, slowing or speeding the rate that the passage is read, respectively. Alternatively, the system 101 may have the capability so that other functions may be assigned to controls 127A.

The control panel 127 may include a speaker 171 placed on the control panel 127, as shown in FIG. 2.

Figure 3:
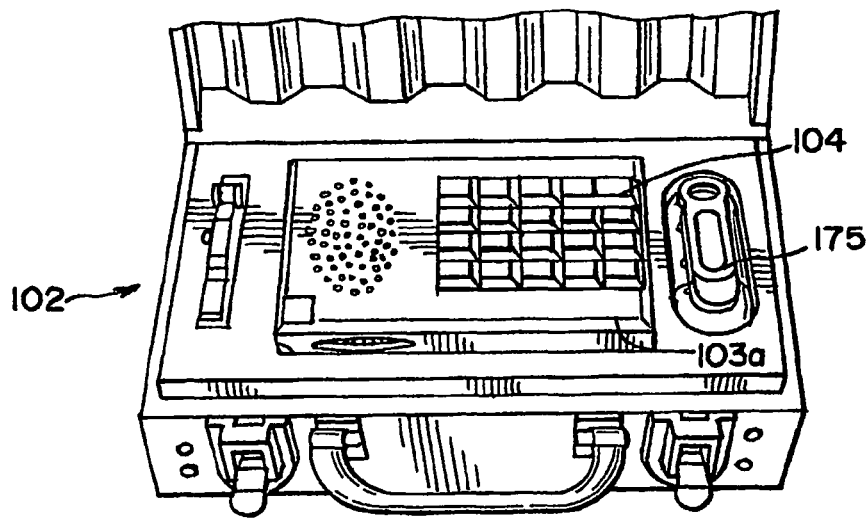
FIG. 3 is a perspective view of one embodiment of a kit that is packaged, including the apparatus of the system and USB storage drive.

System 101 may be packaged as a kit 102, as shown in FIG. 3. Kit 102 could include a keypad housing 103*a* having a keypad 104 and a USB storage drive 175, discussed in more detail herein. Such a kit 102 provides the advantage of being a single kit having numerous applications and capable of cooperating with numerous devices. Additionally, such a kit 102 is portable. A standard keyboard, specially-designed keyboard, or Braille keyboard may be included with kit 102. Alternatively, a user's own keyboard may be connected to system 101. In yet another embodiment, a standard keyboard, specially-designed keyboard or keypad, or Braille keyboard may be directly incorporated onto system 101.

Content input 173 may be provided through wire, wireless, in analog form or in digital form, and may be delivered in any number of formats. Content input 173 may include information already in digital format or information in other formats including a printed page or audio recording. Illustrative of digital content that may be used as content input 173 are a text file, a MICROSOFT WORD word processing software file, an ADOBE ACROBAT computer program File, an HTML document, an XML document, an xHTML document, a QUARK XPRESS computer application document, a WORDPERFECT word processing application document, an SGML document, and an ADOBE PAGEMAKER desktop publishing program document, or any other type of electronic document or work.

The content input 173 may include that which provides navigation points within the content input 173. For example, if the content input 173 is a book or other work, data may be imbedded in the content input 173 that provides chapters, subheadings, an index, and/or other types of information. When such content input 173 is scanned or into system 101, system 101 can use the imbedded navigation points and other data to create a DOM tree, illustrated by step 106 in FIG. 19.

DOM stands for Document Object Model, which represents documents as a hierarchy of node objects. (This applies to HTML as well as XML documents.) Some of these node objects may have "child" nodes and others may have "leaf" nodes. A DOM tree illustratively provides an overview of the work and sets up navigation points within the work that can be accessed without having to fast-forward through the entire work. Similar to tracks on a compact disc, the navigation points in a work allow a user to skip over content to get to the content that is desired. The DOM tree may also provide headers for the navigation points, i.e. "Chapter 5: Reading Comprehension".

Figure 19:
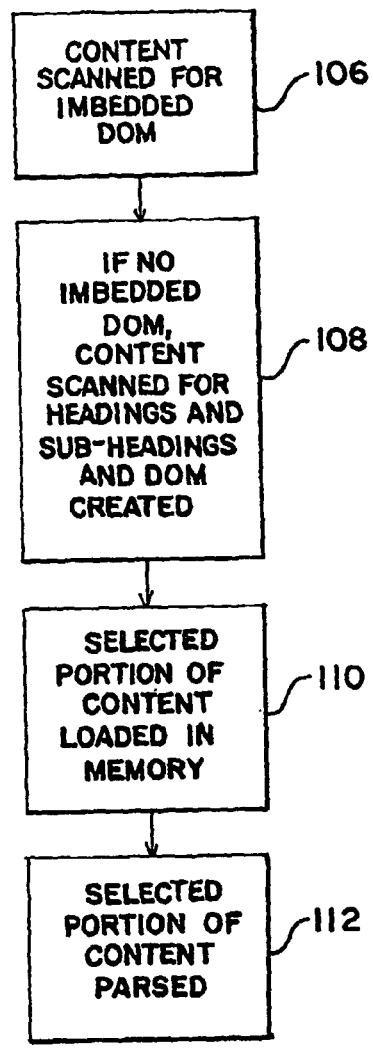
FIG. 19 is a flowchart showing the steps of scanning content for DOM, creating DOM if no embedded DOM is found in the content, and parsing the content.

In the event that content input 173 does not contain imbedded data that can be used to construct a DOM tree, as illustrated in step 108 of FIG. 19, an embodiment of the system 101 may be configured to construct a DOM tree based on a review of the content input 173. When content input 173 is first accessed by system 101, system 101 scans for headers or other indicia of the organization of the content input 173. These indicia can be arranged by importance (i.e. headings versus sub-headings), and/or may be organized in sequence or any other manner sensible to the understanding and organization of the work.

One advantage of creating a DOM tree is that the entire content input 173 does not need to be loaded into the database of system 101 at one time. Therefore, the database/memory of system 101 could be used for more immediate functions, rather than the storage of a large work. Using a book as an example, and referring to step 110 of FIG. 19, an embodiment of the system 101 could load the currently accessed chapter, and the chapter following the current chapter, but system 101 would not need to load the entire work. When a new chapter is accessed, only those chapters deemed important to be in memory would be loaded into the database of system 101.

The DOM tree can be complemented with "parsing" that is performed by system 101, illustrated as step 112 in FIG. 19. Parsing takes the sections provided by the DOM tree and further separates them—even down to a word-by-word or letter-by-letter basis. By parsing the sections of the work, other important functions may be performed by system 101. For example, system 101 can then highlight individual words, color code passages or words, color code subjects/predicates/objects of sentences, phonetically pronounce words or "sound out" words with written syllables, provide sign language for words and phrases, provide dictionary definitions or thesaurus equivalents, or even translate words and phrases into other languages. System 101 also has the capability of providing clear and logical descriptions of graphics, charts, tables, and other visual embodiments. Of course, other capabilities are within the scope of the invention.

In one embodiment, system 101 includes a processor capable of directing and completing the functions disclosed herein. The processor is illustratively a VIA C3 processor (900 MHz) that operates with Windows XP. It should be understood, of course, that other operating platforms and processors are within the scope of the disclosure, and any references herein to particular configurations are meant to be illustrative in nature only.

Random Access Memory (RAM) is also included in this embodiment, the illustrative RAM having the characteristics of 256 MB with one 144-pin SODIMM module. A 20 gigabyte 2.5" Ultra DMA 33/66 hard drive is also included in system 101. System 101 can have a video processor such as Intel 810, with 11 MB of shared video memory, supporting up to 1280×1024 pixel resolution. Furthermore, a sound card may be included, such as a 16-bit Soundblaster® card to drive either a built-in speaker or an external speaker.

System 101 can have an input/output port configuration such as the following: two USB ports, a VGA port, a 3.5 mm micro-phone port, a 3.5 mm line-out port, an S-video and/or AV video port, a six-pin PS/2 mouse port, a six-pin PS/2 keyboard port, and a connector for a docking station. The optional docking station may be configured to have an ATAPI interface slim 24× CD-ROM, a 3.5" floppy disk drive, a nine-pin serial port, a 25-pin parallel port (EPP/ECP), and two additional USB ports. Power for the system and/or docking station may be provided by electricity or battery power.

System 101 is illustratively configured to use a USB storage drive 175, visible in FIG. 3, as an input device for content input 173. Furthermore, USB storage drive 175 can be used to store content such as answers or responses to a test, store location in a book, or store any other interactive features that might be employed by system 101. The use of USB storage drives 175 permits numerous applications of system 101. A tutor may hand out homework on the drives for students to input into their own systems 101; a test administrator could hand out tests at the beginning of the allotted timeframe, the tests to be completed on the system 101; a book (or other work) distributor could send its content on such drives.

Once content input 173 is connected and/or loaded onto system 101, system 101 reads such content input 173 and determines what conversion will be necessary to format it into the appropriate internal code used during processing. Illustratively, a proprietary XML code is used, but the use of other computer codes is within the scope of the disclosure.

Figure 4:
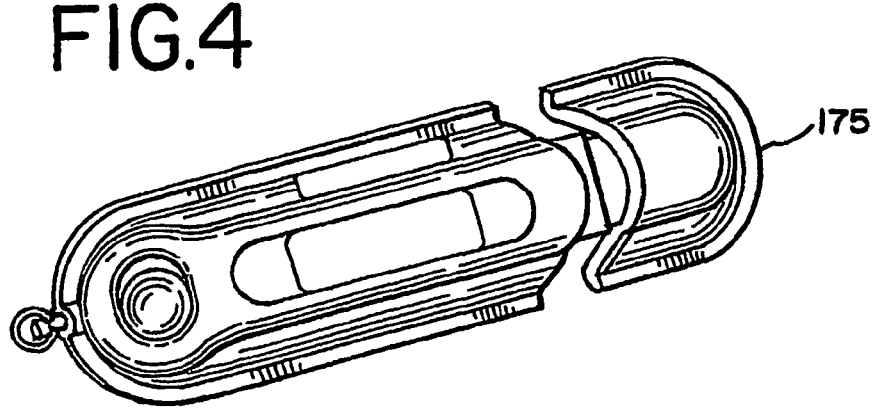
FIG. 4 is a view of one embodiment of a USB storage drive for an apparatus of the system.
Figure 5:
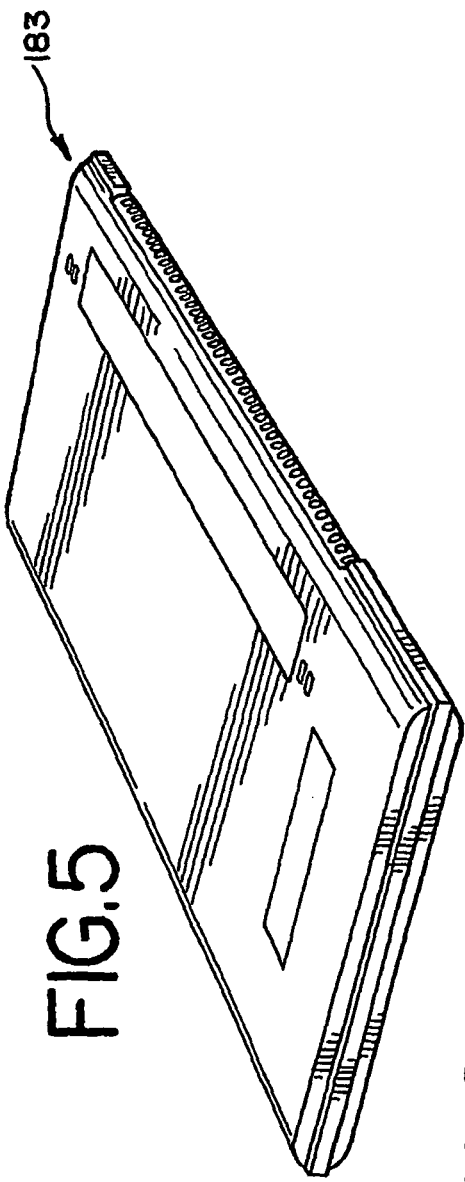
FIG. 5 is a view of one embodiment of a Braille display device.
Figure 6:
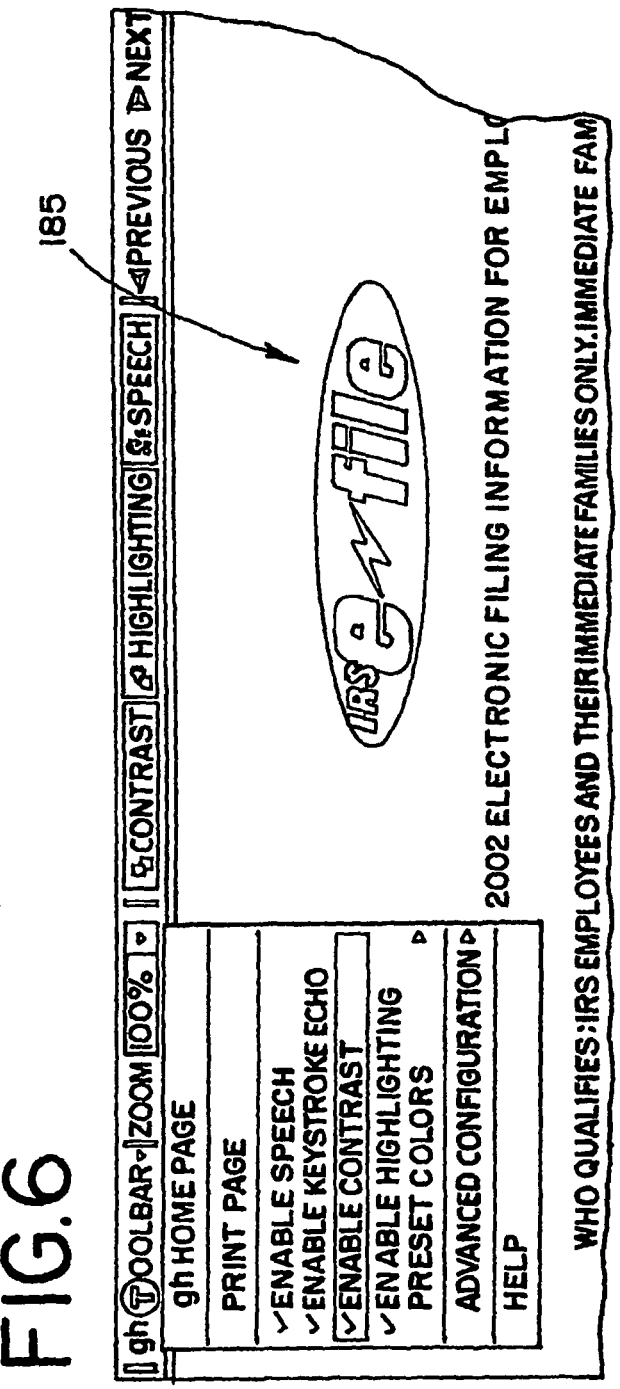
FIG. 6 is a view of one embodiment of a software application as used in viewing a document.
Figure 7:
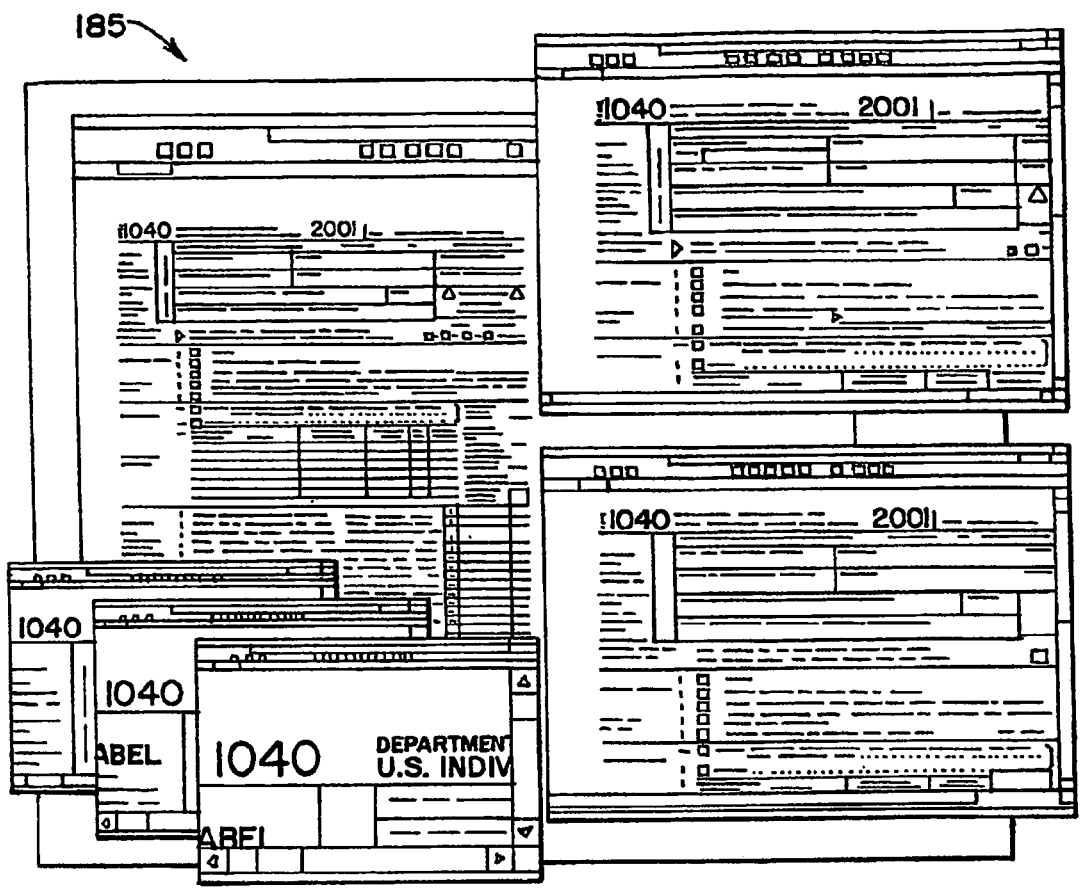
FIG. 7 is another example of a software application used to view a document.
Figure 8:
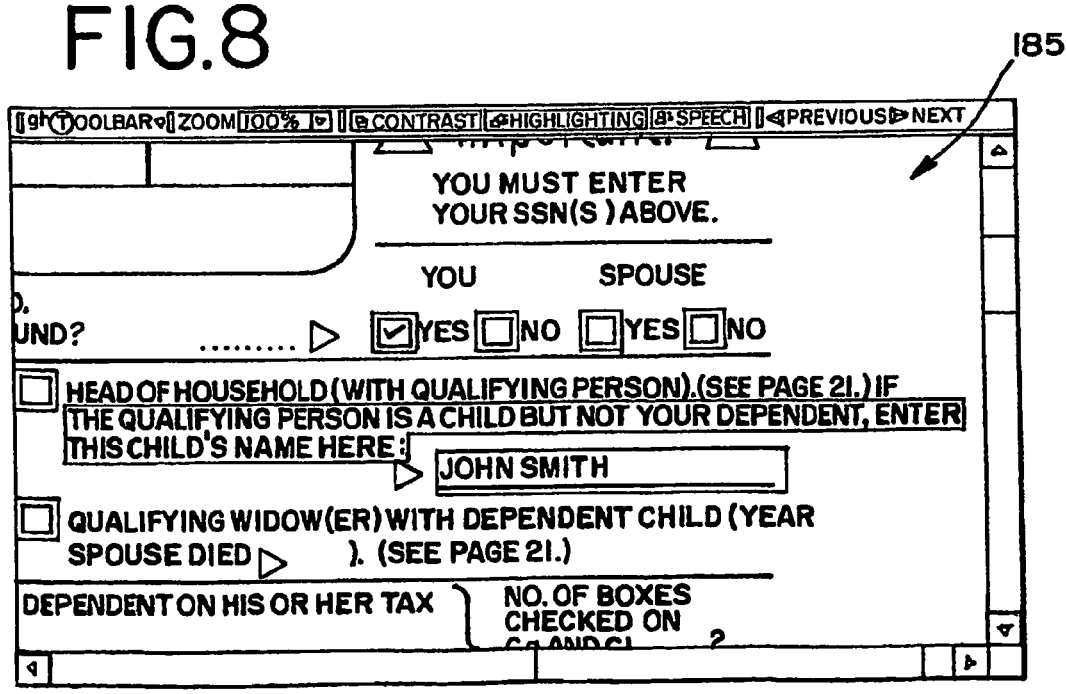
FIG. 8 is yet another example of a software application used to view a document.

Once content input 173 is processed by system 173, output 174 (as can be seen in FIG. 2A) can be produced in various formats. Such output 174 can be synchronized for multiple simultaneous outputs 174. System 101 contemplates that output 174 can be produced in any number or combination of ways, and delivered to any number or combination of devices. For example, digitized output may be delivered to a monitor, a speaker (either internal or external to system 101), headphones, a Braille display device 183 (FIG. 5), a printer, a USB storage device 175 (FIG. 4), a web page, a database, and/or a variety of custom playback and viewing programs. It should be noted that almost any kind of electronic output format can be outputted or delivered. The output 174 may be in the form of Nemeth Braille Code, an image delivered in any number of formats, an audio stream delivered in any number of formats, or a text stream delivered in any number of formats. The output 174 can utilize sound effects, speech generation, animation, and/or a sign language avatar 184, visible in FIG. 10.

Figure 20:
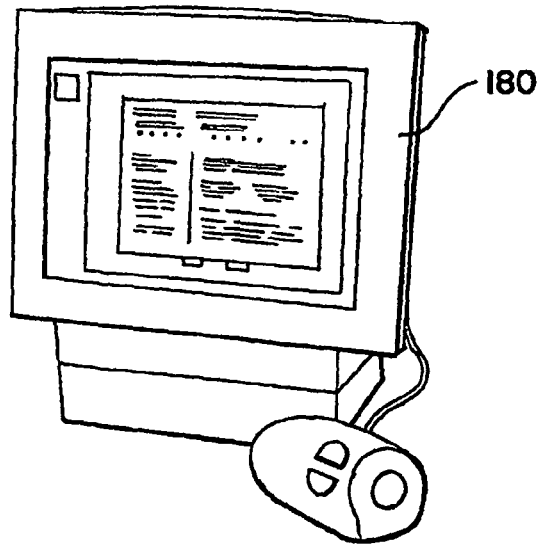
FIG. 20 shows a portable display that can be used with the system.

A portable monitor 180 may be included with system 101, such as is shown in FIG. 20. Portable monitor 120 may have a thin profile and flat screen. It could be constructed of a durable metallic substance so as to increase the life of the monitor despite its portability.

When the output 174 format is a hard-copy, it can be pre-rendered and produced as an actual physical copy by printing, embossing, mastering, and other large-scale production techniques. It should be understood, however, that other output 174 formats are within the scope of the invention.

It should also be noted that the use of XML as a base code allows the output 174 files to be delivered in a variety of delivery channels. The output 174 formats can be accessed as hard copy, using a computer (via the Internet or removable media such as CD-ROM and USB drives), using a telephone (cellular or land-line), and using a television (via Interactive Cable Television). The output 174 could be delivered to a hearing aid or cochlear implant.

In another embodiment, a software program is disclosed for facilitating communication to, with, and for persons with special needs. The software program may be resident on system 101, as disclosed above, or it may be provided as an addition to any computer having any type of operating system. The software program functions similarly to the above-described system 101, converting any input source into a variety of output 174 possibilities. Again, XML code can be used for such conversion, as can other types of code.

An example of such software being implemented can be seen in FIGS. 6-9. In such an example, the content input 173 is a tax form 185, and the output 174 is a display screen that can be enlarged, highlighted, contrasted, or modified in various other ways in order to allow a vision-impaired user to review and/or revise the tax form. As can be seen in FIG. 9, mouse-over technology can be employed by the software. Navigational cues may also be delivered by the software. For example, when inquired, the software could provide cues such as what page the user is on, where the user is in relation to the entire document, etc. The software provides a default keystroke list, but permits user configuration of the keystroke list. The software permits the completion of forms and documents whether or not the computer is connected to the Internet. The software also provides for online submissions, e-mail submissions, and other manners of saving or submitting content.

The disclosed software program can also be configured for particular uses, such as, for example, testing environments. As can be seen in FIGS. 10-13, a number of test-specific options can be provided by the disclosed software program. A typical test question 187 is shown in FIG. 11, such question being answerable in any number of manners, such as the depression of buttons 151, 153, 155, 157, or 159 (shown in FIG. 2), as well as the depression of keys on a keyboard (not shown). Alternatively, icons, voice commands or any other command input 172, as disclosed herein, may assist a test-taker in answering the question. The software can be configured to time portions of the test, to not permit a test taker to return to certain portions of tests, and to even allow a proctor to add additional time if for some reason circumstances require. A proctor could be provided with other controls, such as the ability to cancel a section if the student were caught cheating.

Another feature provided is tutorials for test proctors and test takers. The proctor tutorial is designed to help a non-disabled test proctor become comfortable with the system and software, and to be knowledgeable of the problems or questions that may be encountered. The student tutorial likewise assists a disabled test taker in becoming comfortable with the system and software, so that precious time during a test is not lost to being unfamiliar with the system and software.

Figure 12:
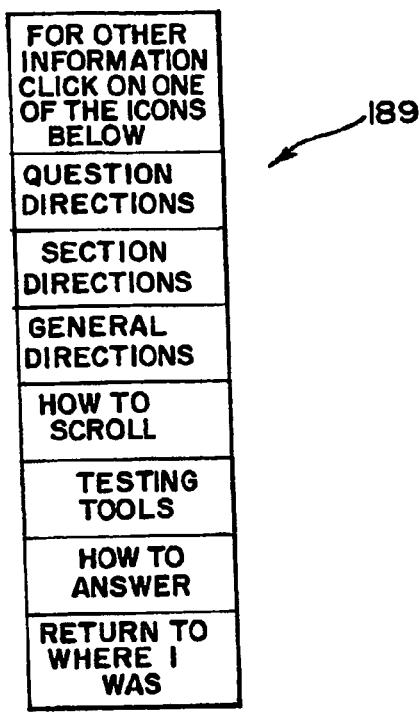
FIG. 12 shows a sample help menu for use in test-taking embodiments produced by software.
Figure 13:
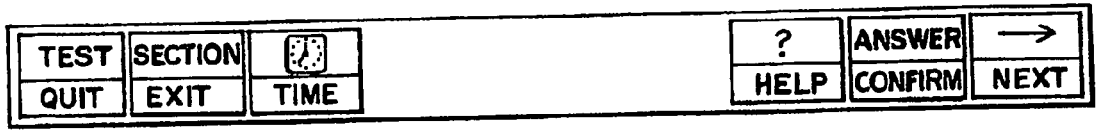
FIG. 13 shows a sample test toolbar for use in test-taking embodiments of the software.

FIG. 12 illustrates a help menu 189 that could be incorporated in a test environment. Additionally, a test tool bar 191 such as that shown in FIG. 13 may be incorporated into the software.

Figure 14:
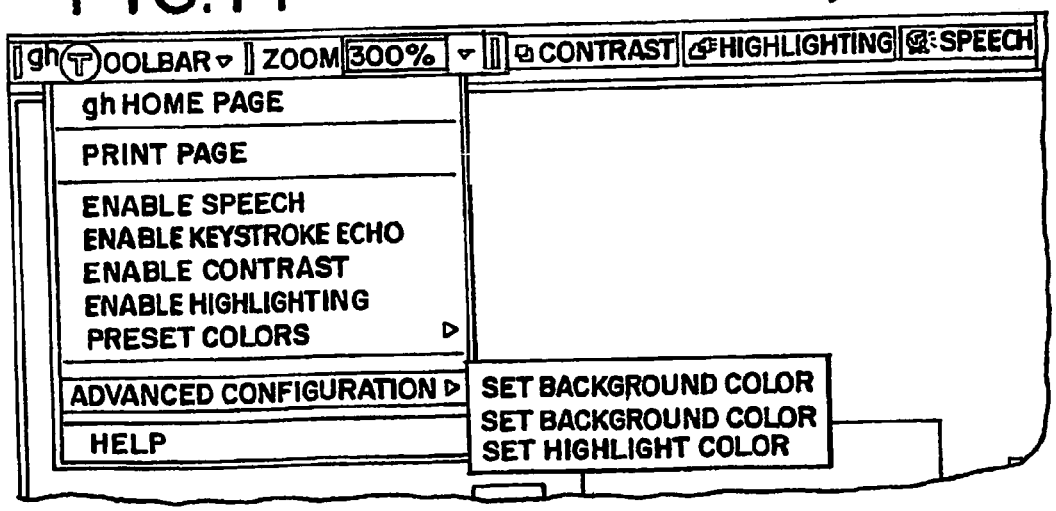
FIG. 14 shows another embodiment of a toolbar.

In another embodiment, shown in FIG. 14, elements of the disclosed software may be incorporated into a toolbar 193 for an existing program, for example, Internet Explorer, Microsoft Word, or any other program having a tool bar. Such a toolbar 193 would provide options for a vision impaired user who is attempting to utilize the third-party software. The toolbar would provide options such as speech enablement, keystroke echo, contrast control, highlighting, color choice, enlargement of text, etc.

Figure 15:
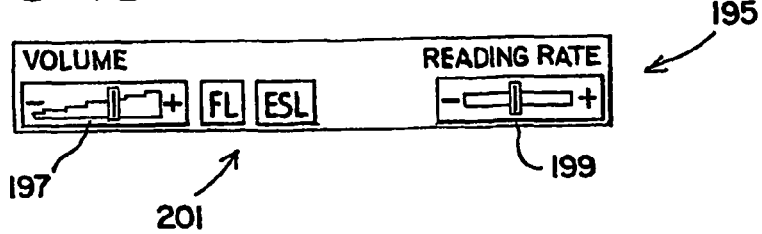
FIG. 15 shows yet another toolbar that can be used in the playback of various content.

Regardless of the application, the software may incorporate text-to-speech (TTS) technology, which converts content input 173 to generated speech for a user. An example of a toolbar 195 for use in TTS applications can be seen in FIG. 15. Such a toolbar 195 illustratively has volume control 197, reading rate 199 (rate at which the speech is generated), and voice selection 201 controls. The need for external software and large-screen technology is eliminated with the use of the presently disclosed system and methods.

Figure 16:
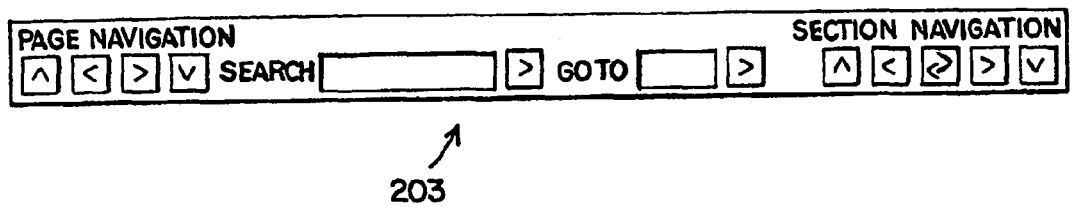
FIG. 16 shows still another toolbar that can be used in the playback of various content.

A navigation toolbar 203 can be seen in FIG. 16. Such a navigation toolbar 203 can be incorporated into any of the devices disclosed herein, such as a display, an internet browser, an existing third-party application such as Microsoft Word, or as a stand-alone toolbar. Navigation toolbar 203 includes digital buttons for navigating through a document or media, as disclosed above.

Figure 17:
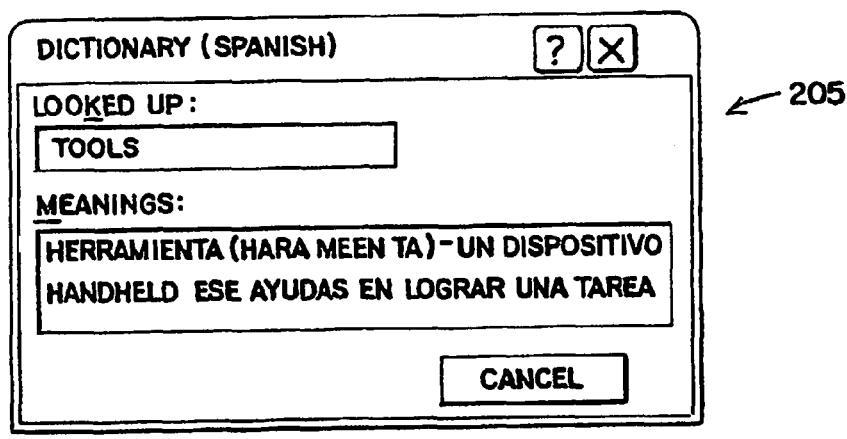
FIG. 17 is a screenshot of a dictionary that can be incorporated in the software.

A screenshot 205 of an illustrative dictionary can be seen in FIG. 17. A dictionary may be incorporated into any of the above output 174 formats to assist a user. The dictionary may also provide translations to or from foreign languages.

Figure 18:
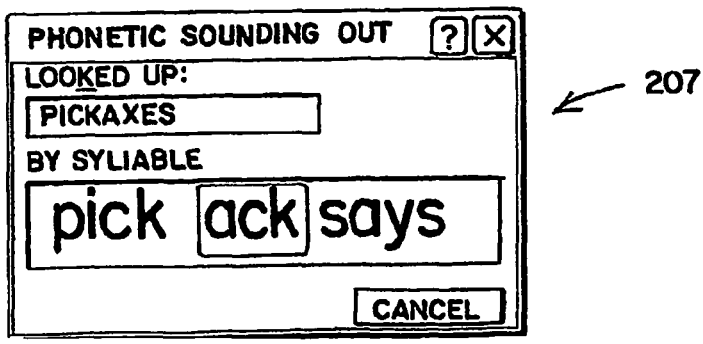
FIG. 18 is a screenshot of a phonetic assistant that can be incorporated in the software.

A screenshot 207 of a phonetic assistant can be seen in FIG. 18. Similar to the dictionary, a phonetic assistant may be incorporated into any of the above-listed output 174 formats to assist a user in phonetically pronouncing words and phrases.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A method of communicating content to a special needs person, said method comprising the steps of:
   accepting content input;
   using a processor to convert said content input into a converted content,
   providing a computerized output configuration toolbar to the special needs person;
   modifying output to the special needs person based upon a selected configuration, wherein the toolbar is configured to modify an existing third-party software application;
   loading a test onto a portable system;
   providing a plurality of communication channels on the portable system by which the person may interact with the portable system;
   recording responses from said individual communicated via at least one of said channels; and
   using the processor to prevent the person from returning to a portion of the test.

2. The method of claim 1, wherein the special needs person can modify voice selection.

3. A method of communicating content to a special needs person, said method comprising the steps of:
   accepting content input;
   using a processor to convert said content input into a converted content;
   providing a computerized output configuration toolbar to the special needs person, wherein the toolbar is configured to change a reading rate at which speech is generated;
   modifying output to the special needs person based upon a selected configuration;
   loading a test onto a portable system; providing a plurality of communication channels on the portable system by which the special needs person may interact with the portable system, the channels including at least one of a Braille keyboard and a sip-and-puff device; and
   recording responses from said special needs person communicated via at least one of said channels.

4. The method of claim 1, comprising the further step of providing a computerized avatar to facilitate communicating of the content.

5. The method of claim 1, comprising the further step of enabling the special needs person to use the toolbar to change a reading rate at which speech is generated.

6. The method of claim 1, comprising the further step of using the processor to time portions of the test.

7. The method of claim 1, comprising the further step of using the processor to enable a proctor to add additional time for taking the test.

8. The method of claim 1, comprising the further step of using the processor to enable a proctor to cancel a portion of the test.

9. The method of claim 1, further comprising the step of delivering the portable system to a site at which testing content may be used.

10. The method of claim 1, further comprising a step of converting the testing content to XML format.

11. The method of claim 3, comprising the further step of using the processor to time portions of the test.

12. The method of claim 3, comprising the further step of using the processor to prevent the person from returning to a portion of the test.

13. The method of claim 3, comprising the further step of using the processor to enable a proctor to add additional time for taking the test.

14. The method of claim 3, wherein the providing of channels step includes permitting access to a sip-and-puff device.

15. A method of communicating content to a special needs person, said method comprising the steps of:
   accepting content input;
   using a processor to convert said content input into a converted content,
   providing a computerized output configuration toolbar to the special needs person;
   modifying output to the special needs person based upon a selected configuration, wherein the toolbar is configured to modify an existing third-party software application;
   loading a test onto a portable system;
   providing a plurality of communication channels on the portable system by which the person may interact with the portable system wherein the providing of channels step includes permitting access to at least one of an access group comprising a Braille keyboard and a sip-and-puff device; and
   recording responses from said individual communicated via at least one of said channels.

* * * * *